July 2, 1974    KEN KOIZUMI ET AL    3,822,121
PRODUCTION OF LIGHT-CONDUCTING GLASS FIBERS
BY MOLTEN BATH HEATING
Filed Dec. 24, 1970
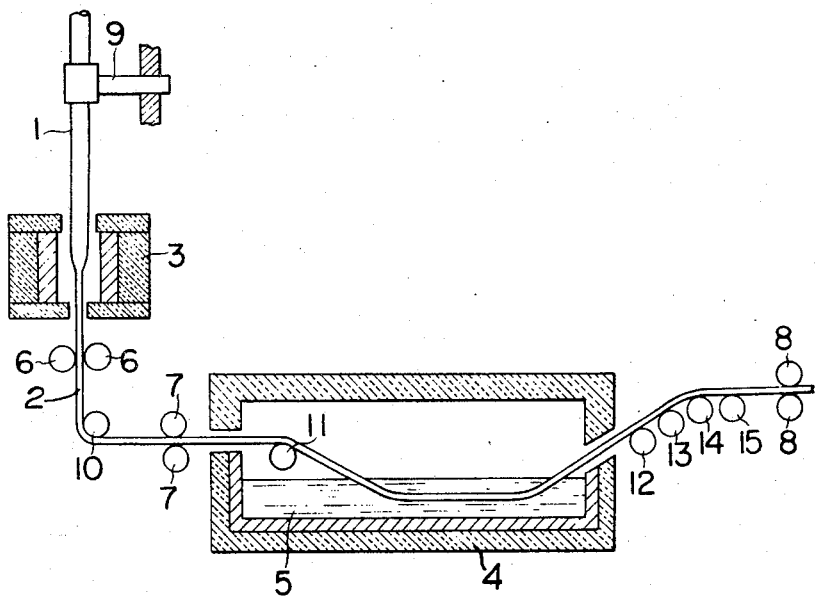

United States Patent Office

3,822,121
Patented July 2, 1974

3,822,121
PRODUCTION OF LIGHT-CONDUCTING GLASS
FIBERS BY MOLTEN BATH HEATING
Ken Koizumi, Kawanishi, and Motoaki Yoshida, Takarazuka, Japan, assignors to Nippon Selfoc Kabushiki Kaisha (also known as Nippon Selfoc Co., Ltd.), Tokyo-to, Japan
Filed Dec. 24, 1970, Ser. No. 101,291
Claims priority, application Japan, Dec. 30, 1969, 45/425
Int. Cl. C03c 25/02; C03b 18/00
U.S. Cl. 65—3
9 Claims

ABSTRACT OF THE DISCLOSURE

A glass fiber comprising a core and a coating layer respectively containing ions of high and low degrees of contribution to refractive index is continuously spun and passed through a molten medium at a high temperature of a specific gravity substantially equal to that of the glass fiber thereby to cause mutual thermal diffusion of the two kinds of ions to establish a desired refractive index distribution as deformation, which would otherwise be caused by the softening of the glass fiber due to the high-temperature treatment, is prevented.

BACKGROUND OF THE INVENTION

This invention relates generally to light-conducting structures and more particularly to a new and advanced process and apparatus for producing light-conducting glass structures each having a refractive index gradient wherein the refractive index varies continuously in directions perpendicular to the optical axis of the structure.

Recently, intense reasearch has been directed toward transmission paths in light communication utilizing laser light. A light-conducting structure revealed at the Denshi Tsushin Gakkai Zenkoku Taikai [National Convention of the Electronic Communication Society (of Japan)] of 1969 is, as disclosed in Preprint S 5–5, page 70, a glass fiber (filament) or glass bar (hereinafter referred to collectively as focusing light-conducting fiber, or merely fiber) having in the vicinity of its central axis a region wherein the refractive index decreases substantially in proportion to the square (second power) of the distance from the central axis. An advantageous feature of this fiber is that it is almost completely free of effects due to the atmosphere and other environmental conditions and, depending on the necessity, can be made to possess flexibility.

A basic method for producing this light-conducting fiber, as disclosed in U.S. Patent Application Ser. No. 806,368, filed on Mar. 12, 1969, now abandoned in favor of continuation application Ser. No. 147,256 filed May 26, 1971 entitled "Light-Conducting Glass Structures and Production thereof" comprises establishing a distribution of concentration of modifying oxides within the glass by utilizing the mutual thermal diffusion of cations, whereby ion exchange between the glass and a molten salt or mutual diffusion of cations between glasses of different composition is caused to take place.

When a glass fiber comprising a core and a coating layer therearound, respectively of different composition, is maintained at a high temperature, a mutual diffusion of ions occurs through the boundary surface or interface between the core and coating layer. However, in order to establish a refractive index distribution fully sufficient for light conduction, it is desirable that diffusion be caused to occur between ions of high value of electronic polarizability per unit volume to be contained in the core glass, that is, ions of a high degree of contribution with respect to the refractive index, for example, thallium ions, and ions of relatively low value of electronic polarizability to be contained in the coating glass, that is, ions of low degree of contribution with respect to the refractive index, for example, at least one kind of ions from among Li, Na, K, Rb, and Cs ions.

This principle is described in detail in U.S. Patent Application Ser. No. 806,368, filed Mar. 12, 1969, now abandoned in favor of continuation application Ser. No. 147,256 filed May 26, 1971, entitled "Light-Conducting Glass Structures and Production Thereof."

Particularly, when the heat-treatment conditions are appropriately selected, the refractive index distribution in a cross section in the vicinity of the optical axis of the fiber glass can be caused to assume a parabolic form which substantially conforms to the relationship $$n = n_0(1 - ar^2)$$

where $n_0$ is the refractive index at the central axis, $n$ is the refractive index at a point at a radial distance $r$ from the central axis, and $a$ is a constant. A fiber having such a refractive index distribution has a high practical utility as a transmission path in laser communication and as a novel lens-effect structure for optical use and information processing.

When a molten salt or some other molten substance is used as the medium in a heat treatment for imparting a refractive index distribution to a fiber glass, advantages such as the ease with which heating of the fiber glass suspended in the molten substance and the absence of surface irregularities due to contact with solid objects are afforded.

On the other hand, however, if the heat-treatment temperature is raised, for the purpose of shortening the treatment time, to a value such that the viscosity of the glass becomes $10^{10}$ poise, the temperature will approach the softening temperature (temperature at which the viscosity becomes approximately $10^8$ poise) of the fiber glass, whereby the fiber glass will be subjected to a gravity force or a buoyant upthrust depending on the difference in the specific gravities of the fiber glass and the molten medium. As a result, the performace of the glass fiber as a light-conducting structure deteriorates because of defects such as gradual variation in the diameter of the fiber in its longitudinal direction and deformation of its cross sections.

We have found that certain disadvantages and defects, such as the above mentioned deformation which arise in the fiber glass at high temperatures can be readily eliminated by selecting a molten salt or some other molten medium of a specific gravity which is almost equal to that of the glass fiber as the heat-treatment medium, and that, as a result of the active, mutual thermal ion diffusion due to the use of high temperatures, the glass fiber, particularly a focusing light-conducting glass fiber having the afore-described refractive index distribution, can be produced in a much shorter time than heretofore.

SUMMARY OF THE INVENTION

It is an object of the present invention to provide a relatively simple and improved process and apparatus for producing light-conducting glass fibers by utilizing the above stated findings and other findings we have made.

More specifically, an object of the invention is to shorten remarkably the extremely long process time which was heretofore considered to be necessary since the mutual thermal diffusion of cations was carried out in a relatively low temperature region.

Another object of the invention is to simplify the entire process by providing a continuous process from the spinning of the glass fiber to the imparting thereto of a focusing characteristic.

According to one aspect of the present invention, briefly summarized, there is provided a process for producing light-conducting fibers as described above wherein a glass fiber comprising a core and coating layer containing respectively different kinds of ions is heated thereby to establish the aforedescribed distribution of refractive index, a characteristic feature of the process being that the glass fiber is thus heated by immersion thereof in a molten medium maintained at a high temperature and having a specific gravity substantially equal to that of the glass fiber thereby to cause mutual thermal diffusion between the above mentioned two kinds of ions as deformation, which would otherwise be caused by the softening of the glass fiber accompanying high-temperature heating, is prevented.

According to another aspect of the present invention, there is provided apparatus for producing light-conducting fibers by the process of the invention. This apparatus comprises essentially spinning means for continuously spinning the above mentioned glass fiber, a bath of the above mentioned molten medium provided with heating means to maintain the bath at a high temperature, and conveying means for continuously feeding the spun glass fiber into the bath and withdrawing the same out of the bath.

The nature, principle, and utility of the invention will be more clearly apparent from the following detailed description with respect to a preferred embodiment of the invention when read in conjunction with the accompanying drawing.

BRIEF DESCRIPTION OF THE DRAWING

In the drawing, the single figure is a diagrammatic elevation, in vertical or longitudinal section, indicating one example of practice according to the invention.

DETAILED DESCRIPTION

The glass in the state of a fiber or a bar (rod) prior to being subjected to the heat treatment in this invention comprises two classes of glass as classified by composition. The core structure, which has a cross section of circular shape or nearly circular shape, is a glass containing ions, such as thallium ions, of a high degree of contribution with respect to the refractive index. The glass coating around this core is a glass containing at least one kind of alkali metal such as Li, Na, K, Rb, or Cs, of a degree of contribution to refractive index which is low relative to that of the ions in the core glass.

The boundary between the core glass and coating glass is fully fused. The core may be a bundle of a plurality of core structures, in which case the coating glass is fused with the core structures in a manner to fill the interstices therebetween.

While, ideally, the specific gravities of the glass fiber and the molten medium to be heated and maintained at a high temperature are equal, a difference of 0.4 or less therebetween is ordinarily satisfactory, while a difference of 0.2 or less is preferable. The term "specific gravity" as herein used is that at the high temperature of the heat treatment.

The molten medium used in accordance with this invention may be any substance which is a stable liquid at the above mentioned treatment, has a specific gravity which is substantially equal to that of the glass fiber, and exhibits almost no erosive characteristic with respect to the glass fiber. Ordinarily, inorganic salts or a mixture thereof can be used for this medium. In addition, simple metals, metal oxides (e.g., glasses of low melting points), and the like can be used. In the case where the above mentioned mixture is used, the difference between the specific gravity of the mixture and that of the glass fiber to be treated at the treatment temperature can be reduced by adjusting the mixing ratio of the mixture constituents.

It is also preferable that the coefficients of thermal expansion of the core glass and the coating glass of the glass fiber be as close as possible to each other in order to prevent deterioration of the light-conducting characteristic of the fiber due to internal strains. The two glasses can be so selected that the difference between their thermal expansion coefficients is ordinarily less than $50 \times 10^{-7}$ and preferably less than $20 \times 10^{-7}$ per degree C.

For example, a typical glass fiber of this character has a central part of 0.2 mm. diameter composed (in mole percent) of 3.3 percent of $Tl_2O$, 17.0 percent of $Na_2O$, 9.4 percent of $PbO$, and 70.3 percent of $SiO_2$ and having a thermal expansion coefficient of $124 \times 10^{-7}$ per degree C. and a peripheral coating part of an outer diameter of 0.4 mm. composed (in mole percent) of 3.5 percent of $K_2O$, 17.0 percent of $Na_2O$, 9.0 percent of $PbO$, and 7.5 percent of $SiO_2$ and having a thermal expansion coefficient of $128 \times 10^{-7}$ per degree C.

When this glass fiber is heat treated in a heat medium such as $KNO_3$ salt, for example, in a manner to impart a focusing light-conducting characteristic to the glass fiber as it is prevented from deforming into a tapered shape when suspended in the molten medium, it has heretofore been necessary to carry out the heat treatment for approximately 36 hours while the glass fiber temperature is maintained at 460 degrees C. or lower. At 460 degrees C., the viscosity of the central glass is $10^{10}$ poise, while that of the peripheral glass is $10^{10.6}$ poise.

While it is possible to shorten the heat-treatment time by raising the temperature, for example, 3 hours at 500 degrees C., a difference in diameters of approximately 0.1 mm. per meter of fiber length (tapering) occurs, for example, depending on the manner in which the fiber is suspended. Furthermore, if the glass fiber is treated in a horizontal position, deformation of the fiber cross section and other inconvenient results occur, whereby the focusing light-conducting characteristic of the fiber is greatly impaired.

At 500 degrees C., the viscosity of the central glass is $10^{8.6}$ poise, while that of the peripheral glass is $10^{9.2}$ poise. At this temperature, the specific gravity of the fiber glass is 3.2, while that of the $KNO_3$ salt is 1.7, whereby there is a difference in specific gravities of 1.5.

When, in accordance with the present invention, a salt mixture composed (in mole percent), for example, of 25 percent of $PbSO_4$, 37 percent of $Li_2SO_4$, 26 percent of $Na_2SO_4$, and 12 percent of $K_2SO_4$ and having a specific gravity of 3.1 was used as the heat medium for heat treatment of the above described glass fiber, tapering did not occur even at high-temperature treatment at temperatures about 600 degrees C. Accordingly, it was possible to produce focusing light-conducting glass fibers with a treatment of 4 minutes at a temperature of 650 degrees C. and with a treatment of 0.8 minutes at 800 degrees C.

The viscosities of the central glass and peripheral glass were $10^{5.9}$ poise and $10^{6.2}$ poise, respectively, at 650 degrees C. and were $10^{4.3}$ poise and $10^{4.5}$ poise, respectively, at 800 degrees C.

The times required to impart focusing characteristic to a glass fiber having the above specified compositions and having an outer diameter of 1.0 mm. and a diameter of its central glass of 0.5 mm. when immersed in the above specified salt mixture maintained at 650 degrees C. and 800 degrees C. were 25 and 5 minutes, respectively.

In other words, while it was very difficult by known methods to hold a glass fiber at a temperature higher than that at which the viscosity of the glass fiber becomes $10^{10}$ poise without causing the fiber to deform, it is possible by the practice of this invention to hold the fiber at the temperature (working temperature) at which the glass fiber viscosity becomes $10^4$ poise or at a higher temperature without incurring a deformation in the fiber.

Accordingly, a substantial shortening of the process time is advantageously attained by the practice of this invention, by which the process time is of the order of from 1/10 to 1/100 of that required in the prior art.

Furthermore, when a focusing glass structure of large diameter, for example, a structure having a central part of a diameter of 3 mm., is desired, the treatment time necessary is of the order of 2,000 hours, which is too excessive to be practical. By the process of this invention, however, the required treatment time is 15 hours.

Thus, by the practice of this invention, a glass fiber can be formed by a process having a very short duration to have a specific refractive index distribution. Accordingly, it is possible, by continuously spinning a glass fiber and passing this glass fiber thus spun continuously through a bath of a molten heat medium, to readily produce a light-conducting fiber or filament of extremely great length having a desired refractive index distribution. Alternatively, of course, the spun glass fiber can be first taken up on a winding drum and then passed through a bath of molten medium at a speed different from the spinning speed thereby to produce a light-conducting fiber.

One method of spinning a glass fiber of the above described character is to store molten glasses in respective chambers of a double pot and drawing a glass fiber through concentric nozzles provided at the bottom part of the double pot. According to this invention, however, a glass rod of the above described composition, an outer diameter of 20 mm., and a central part of a diameter of 10 mm. is heated to 650 or 750 degrees C. and spun by drawing into a glass fiber of an outer diameter of 1.0 mm. or 0.4 mm. We have found that the drawing speeds suitable for this operation are as indicated in Table 1.

TABLE 1

| Temp. (° C.) | Drawing speed (cm./min.) | |
|---|---|---|
| | 1.0 mm. outer diameter | 0.4 mm. outer diameter |
| 650 | 150–300 | 300–900 |
| 750 | 200–350 | 600–1,300 |

The glass fiber thus spun is caused to advance in a substantially horizontal direction in an immersed state through a bath of a molten salt. The required length of the salt bath in this case to carry out heat treatment in conformance with the drawing speeds indicated in Table 1 are as set forth in Table 2, the aforementioned treatment time being taken into consideration.

TABLE 2

| Drawing speed for spinning (cm./min.) | Length of salt bath (meter) | | | |
|---|---|---|---|---|
| | Glass fiber outer diameter 1.0 mm. | | Glass fiber outer diameter 0.4 mm. | |
| | 650° C. treatment | 800° C. treatment | 650° C. treatment | 800° C. treatment |
| 150 | 38 | 7.5 | | |
| 300 | 75 | 15 | 12 | 2.4 |
| 450 | | | 18 | 3.6 |
| 600 | | | 24 | 4.8 |
| 750 | | | 30 | 6.0 |
| 900 | | | 36 | 7.2 |

As is apparent from the values shown in Table 2, it is possible to accomplish continuous production of a focusing light-conducting glass fiber by selecting the spinning speed and the treatment temperature and using a heat-treatment salt bath furnace of a length of approximately 10 meters in the case of a glass fiber of 1.0 mm. outer diameter and approximately 3 meters in the case of a fiber of 0.4 mm. outer diameter.

In order to indicate still more fully the nature and utility of this invention, the following specific example of practice constituting a preferred embodiment of the invention and results are set forth with reference to the accompanying drawing, it being understood that this example is presented as illustrative only and that it is not intended to limit the scope of the invention.

EXAMPLE

A glass rod comprising a central glass of 10 mm. diameter composed (in mole percent) of 3.3 percent of $Tl_2O$, 17.0 percent of $Na_2O$, 9.4 percent of PbO, and 70.3 percent of $SiO_2$ and a peripheral glass of an outer diameter of 20 mm. composed (in mole percent) of 3.5 percent of $K_2O$, 17.0 percent of $Na_2O$, 9.0 percent of PbO, and 70.5 percent of $SiO_2$, the central and peripheral glasses being fused together and having a concentrically circular cross section, is prepared.

This glass rod 1 is fed at a speed of 0.24 cm./minute by feeding means 9 through a heating furnace 3 maintained at 650 degrees C. and is continuously spun by drawing at a speed of 600 cm./minute by means of drawing rolls 6 into a glass fiber of 0.4 mm. outer diameter with a central part of 0.2 mm. diameter.

The glass fiber 2 thus spun is introduced by feed and guide rollers 10, 7, and 11 into a furnace 4 for effecting mutual thermal diffusion ions, which includes a molten bath containing a molten salt mixture 5 containing (in mole percent) 25 percent of $PbSO_4$, 37 percent of $Li_2SO_4$, 26 percent of $Na_2SO_4$, and 12 percent of $K_2SO_4$ and maintained at approximately 800 degrees C. by a heater (not shown) provided within the furnace 4. The glass fiber 2, which is passed through this salt mixture bath, has an apparent viscosity of approximately $10^{4.5}$ and a specific gravity of approximately 3.2. The specific gravity of the salt mixture maintained at approximately 800 degrees C. is approximately 3.1, and the difference in the specific is therefore approximately 0.1.

We have found that, in order to prevent softening and deforming of the glass fiber when it is not immersed in the salt mixture, it is preferable that the salt mixture bath have a temperature distribution in its longitudinal direction such that the outlet and inlet ends of the bath are maintained at comparatively low temperatures.

While the glass fiber 2 advances through the bath of the salt mixture 5 of approximately 5 meter length in approximately 1 minute, a mutual thermal diffusion occurs through the boundary surface (interface) at the boundary of the central glass and peripheral glass of the fiber principally between the ions within the central glass of high degree of contribution with respect to the refractive index, i.e., thallium ions, and ions within the peripheral glass of low degree of contribution to the refractive index, i.e., potassium and sodium ions.

The glass fiber is then led out of the furnace 4 by guide and drawing rollers 12, 13, 14, 15, and 8 and cooled and is taken up on a winding drum (not shown).

In actual instances of practice, we have succeeded in producing glass fibers by the above described process without incidence of inconvenient deformation of the fibers. More specifically, light-conducting fibers of a long length having focussing, light-conducting characteristics have been produced having a refractive index gradient such that, in the vicinity of the optical axis in planes perpendicular to the optical axis, the refractive index progressively decreased from the center toward the periphery, especially as a function of the second power of the distance from the center, whereby the value of $a$ in the equation set forth hereinbefore was 0.63 mm.$^{-2}$ in the vicinity of the fiber center, that is, within a circle of the central part of 20 micron diameter.

At the outer surface of the glass fiber, also, ion exchange occurs between the alkali metal ions in the peripheral glass and the alkali metal ions in the salt mixture. We have found, however, that ordinarily the alkali metal ions in the salt mixture do not infiltrate into the central glass to an extent such as to impart a deleterious effect on the resulting refractive index distribution within the fiber.

We claim:

1. A process for producing a light-conducting glass fiber comprising: providing a glass fiber composed of a glass core containing therein an initially constant and uniform concentration first ions having a high degree of contribution to the refractive index of glass, and a glass coating layer disposed peripherally around said core and containing second ions having a low degree of contribution to the refractive index of glass, the first and second ions being mutually exchangeable between the glasses; heating said glass fiber at a high temperature sufficiently high to diffuse second ions contained in said coating layer through the boundary surface between said core and said coating layer toward the inside of said core and at the same time to diffuse first ions contained in said core through said boundary surface toward the inside of said coating layer to ion-exchange the first ions in the core by the second ions in said coating layer to establish a refractive index distribution in said core continuously decreasing toward said boundary surface from the center of said glass fiber in each cross-section perpendicular to the center axis of the glass fiber; and carrying out said heating of said glass fiber for a time period such that the refractive index in said core in each cross-section perpendicular to the center axis of said glass fiber decreases in proportion to the second power of the radial distance from the center axis at least in a portion of said core near the center axis; said heating step comprising immersing said glass fiber into a molten medium maintained at a temperature higher than the temperature at which the coil viscosity of said glass fiber is $10^{10}$ poise and wherein the molten medium has a specific gravity such that the difference between the specific gravities of said glass fiber and the molten medium at said high temperature is less than 0.4 to thereby shorten the period of time of the immersion while preventing undesired deformation of said glass fiber.

2. A process according to claim 1; in which said first ions comprise thallium ions and said second ions comprise ions of at least one kind of alkali metal selected from the group consisting of lithium, potassium, sodium, rubidium, and cesium.

3. A process according to claim 1; in which said molten medium comprises a material selected from the group consisting of inorganic salts of metal, mixtures thereof, metals and metal oxides and is a substance in a liquid state which is stable and has little or no erosiveness with respect to said glass fiber.

4. A process according to claim 1; in which said providing step comprises continuously feeding a glass rod composed of a glass core structure containing said first ions and a coating layer containing said second ions and disposed concentrically around said core structure longitudinally, from one end thereof, at a constant speed through a heating furnace, and drawing said one end away from the remainder of the glass rod at a speed greater than said constant speed; and wherein said immersing step comprises continuously introducing the glass fiber drawn away from the heating furnace into said molten medium by beginning with the one end of the glass fiber at a speed which is the same as the drawing speed.

5. A process according to claim 1; in which said providing step comprises continuously preparing said glass fiber by causing a molten glass containing said first ions to flow through a central nozzle to form said glass fiber core and causing a molten glass containing said second ions to flow through an annular nozzle disposed coaxially around the central nozzle to thereby form said glass fiber coating layer; and wherein said immersing step comprises continuously introducing the glass fiber into said molten medium by beginning with one end of the glass fiber at a speed which is the same as the flowing speed.

6. A process for producing a light-conducting glass fiber composed of a core glass having a refractive index gradient throughout its length in each plane perpendicular to the fiber axis continuously decreasing from said axis to the periphery of said core glass, and a coating glass peripherally surrounding said core glass, said process comprising: providing a glass fiber composed of a core glass having a given uniform refractive index and having uniformly dispersed therein first ions which contribute to a greater degree to the refractive index of glass, and a coating glass peripherally surrounding said core glass and having a uniform refractive index lower than said given uniform refractive index and having uniformily dispersed therein second ions which contribute to a lesser degree to the refractive index of glass and which are mutually exchangeable with said first ions; and heating said glass fiber to a temperature high enough and for a time period long enough to effect diffusion of said first ions through the boundary existing between said core and coating glasses into said coating glass coincidently with diffusion of said second ions through said boundary into said core glass to effect ion exchange between said first and second ions and thereby impart to said core glass throughout its length a refractive index gradient in each plane perpendicular to the longitudinal fiber axis continuously decreasing from said fiber axis to the periphery of said core glass, said heating step comprising immersing said glass fiber in a molten bath having a specific gravity relative to the specific gravity of said glass fiber at said temperature such that the difference between the specific gravities is less than 0.4 and maintaining said molten bath at a temperature higher than that at which the core viscosity of said glass fiber is $10^{10}$ poise.

7. A process according to claim 6; wherein said heating step includes heating said glass fiber for a time period long enough to impart to said core glass throughout its length in each plane perpendicular to said fiber axis and in the vicinity of said fiber axis a refractive index gradient which decreases in proportion to the square of the radial distance from said fiber axis.

8. A process according to claim 7; in which said first ions comprise thallium ions and said second ions comprise ions of at least one kind of alkali metal selected from the group consisting of lithium, potassium, sodium, rubidium, and cesium.

9. A process according to claim 7; in which said molten medium comprises a material selected from the group consisting of inorganic salts of metal, mixtures thereof, metals, and metal oxides and is a substance in a liquid state which is stable and has little or no erosiveness with respect to said glass fiber.

References Cited
UNITED STATES PATENTS

| | | | |
|---|---|---|---|
| 3,628,934 | 12/1971 | Duthoit et al. | 65—30 X |
| 3,589,878 | 6/1971 | Achener | 65—30 X |
| 2,992,517 | 7/1961 | Hicks, Jr. | 65—4 |
| 3,146,082 | 8/1964 | Hicks, Jr., et al. | 65—61 X |
| 3,582,297 | 6/1971 | Lakeman | 65—4 |
| 3,320,114 | 5/1967 | Schulz | 65—30 X |
| 3,395,994 | 8/1968 | Cuff | 65—30 X |
| 3,248,193 | 4/1966 | Hohmann | 65—32 |
| 3,375,155 | 3/1968 | Adams | 65—30 |
| 3,486,808 | 12/1969 | Hamblen | 65—30 X |
| 3,083,123 | 3/1963 | Navias | 65—Dig. 7 |
| 3,589,793 | 6/1971 | Curtis | 65—Dig. 7 |

FRANK W. MIGA, Primary Examiner

U.S. Cl. X.R.

65—32, 121, 182 R, Dig. 7, 4, 30 60